(12) United States Patent
Bogliacino et al.

(10) Patent No.: US 11,920,634 B2
(45) Date of Patent: Mar. 5, 2024

(54) WHEEL HUB ASSEMBLY

(71) Applicant: Aktiebolaget SKF, Gothenburg (SE)

(72) Inventors: Fabio Bogliacino, Cortemilia (IT);
Giorgio Missiaggia, Piscina (IT);
Fulvio Carlo Nicastri, Garzigliana (IT)

(73) Assignee: AKTIEBOLAGET SKF (SE)

( * ) Notice: Subject to any disclaimer, the term of this patent is extended or adjusted under 35 U.S.C. 154(b) by 657 days.

(21) Appl. No.: 17/096,449

(22) Filed: Nov. 12, 2020

(65) Prior Publication Data

US 2021/0156427 A1    May 27, 2021

(30) Foreign Application Priority Data

Nov. 21, 2019  (IT) .................. 102019000021774

(51) Int. Cl.
| F16C 33/58 | (2006.01) |
| B60B 27/00 | (2006.01) |
| B60B 27/02 | (2006.01) |
| F16C 19/18 | (2006.01) |
| F16C 33/66 | (2006.01) |

(52) U.S. Cl.
CPC ........ F16C 33/583 (2013.01); B60B 27/0094 (2013.01); B60B 27/02 (2013.01); F16C 19/183 (2013.01); F16C 33/6614 (2013.01); F16C 33/6633 (2013.01); *F16C 2326/02* (2013.01)

(58) Field of Classification Search
CPC .... F16C 19/183; F16C 19/186; F16C 33/583; F16C 33/6614; F16C 33/6633; F16C 2326/02; B60B 27/0094
See application file for complete search history.

(56) References Cited

U.S. PATENT DOCUMENTS

| 7,543,385 B2* | 6/2009 | Kaminski ........... F16C 33/6651 |
| | | 451/49 |
| 8,782,902 B2 | 7/2014 | Pyun et al. |
| 8,858,086 B2* | 10/2014 | Murata ............... F16C 33/6696 |
| | | 384/516 |
| 2010/0087262 A1 | 4/2010 | Une et al. |

FOREIGN PATENT DOCUMENTS

| CN | 102226459 | 10/2011 |
| CN | 102562789 | 7/2012 |
| CN | 108223562 A * | 6/2018 |
| EP | 1830086 | 9/2007 |
| EP | 2711512 | 3/2014 |
| EP | 2711572 | 3/2014 |

(Continued)

OTHER PUBLICATIONS

International Search Report for corresponding Italian Patent Application No. 201900021774 dated Sep. 28, 2020.

*Primary Examiner* — Phillip A Johnson
(74) *Attorney, Agent, or Firm* — Reed Smith LLP

(57) ABSTRACT

Wheel hub assembly for motor vehicles, the group having a radially outer ring with at least one raceway, at least one radially inner ring with a related raceway and at least one ring of rolling bodies interposed between the radially outer ring and the radially inner ring, for sliding inside the raceways, at least one raceway being provided with superficial micropores having a depth (H) between 0.05 μm and 1.5 μm and defining respective micro-tanks for containing a lubricating grease.

20 Claims, 2 Drawing Sheets

(56) References Cited

FOREIGN PATENT DOCUMENTS

| JP | H053647 U | * | 1/1993 | |
|----|-----------|---|--------|---|
| JP | 2006275174 A | * | 10/2006 | |
| JP | 2008128323 A | * | 6/2008 | ............ F16C 33/416 |
| JP | 2008240902 | | 10/2008 | |
| JP | 2009108963 | | 5/2009 | |
| JP | 2009121554 | | 6/2009 | |
| JP | 2009121659 | | 6/2009 | |
| WO | 2008069133 | | 6/2008 | |

* cited by examiner

WHEEL HUB ASSEMBLY

CROSS REFERENCE OF RELATED APPLICATIONS

This application is based on and claims priority to Italian Application No. 102019000021774, filed Nov. 21, 2019, under 35 U.S.C. § 119, the entire contents of which are incorporated herein by reference.

FIELD

The present disclosure relates to a wheel hub assembly provided with a pair of rolling bearings to rotatably support a wheel of a vehicle on a suspension. In particular, the disclosure relates to the raceways of the wheel hub assembly that are provided with suitable microporosity.

Such applications include both the arrangement in which the outer bearing ring can rotate while the inner bearing rings are static, and the opposite arrangement in which the inner rings can rotate and the outer ring is static. Embodiments of the disclosure are also suited to any type of rolling body (balls, rollers, tapered rollers, etc.).

Furthermore, the disclosure relates to a motor vehicle fitted with such a wheel hub assembly.

BACKGROUND

A wheel hub assembly fitted with a bearing unit to rotatably support a wheel of a vehicle on a suspension is known and commonly used. The bearing unit usually includes a pair of rolling bearings.

In the prior art, the wheel hub assembly includes a rotary hub fitted with a joint to couple a rotary element of the motor vehicle, for example the wheel or the disk of a braking element, while the bearing unit comprises an outer ring, a pair of inner rings, one of which can be the hub itself, and a plurality of rolling bodies, such as balls, rollers or tapered rollers. All of these components have axial symmetry about the axis of rotation of the rotary elements, for example the hub and the inner rings of the bearing unit.

BRIEF DESCRIPTION OF THE DRAWINGS

The embodiments in accordance with this disclosure will now be described with reference to the appended drawings, which show some non-limiting examples of embodiment of the disclosure, in which.

DETAILED DESCRIPTION

Figure 1:
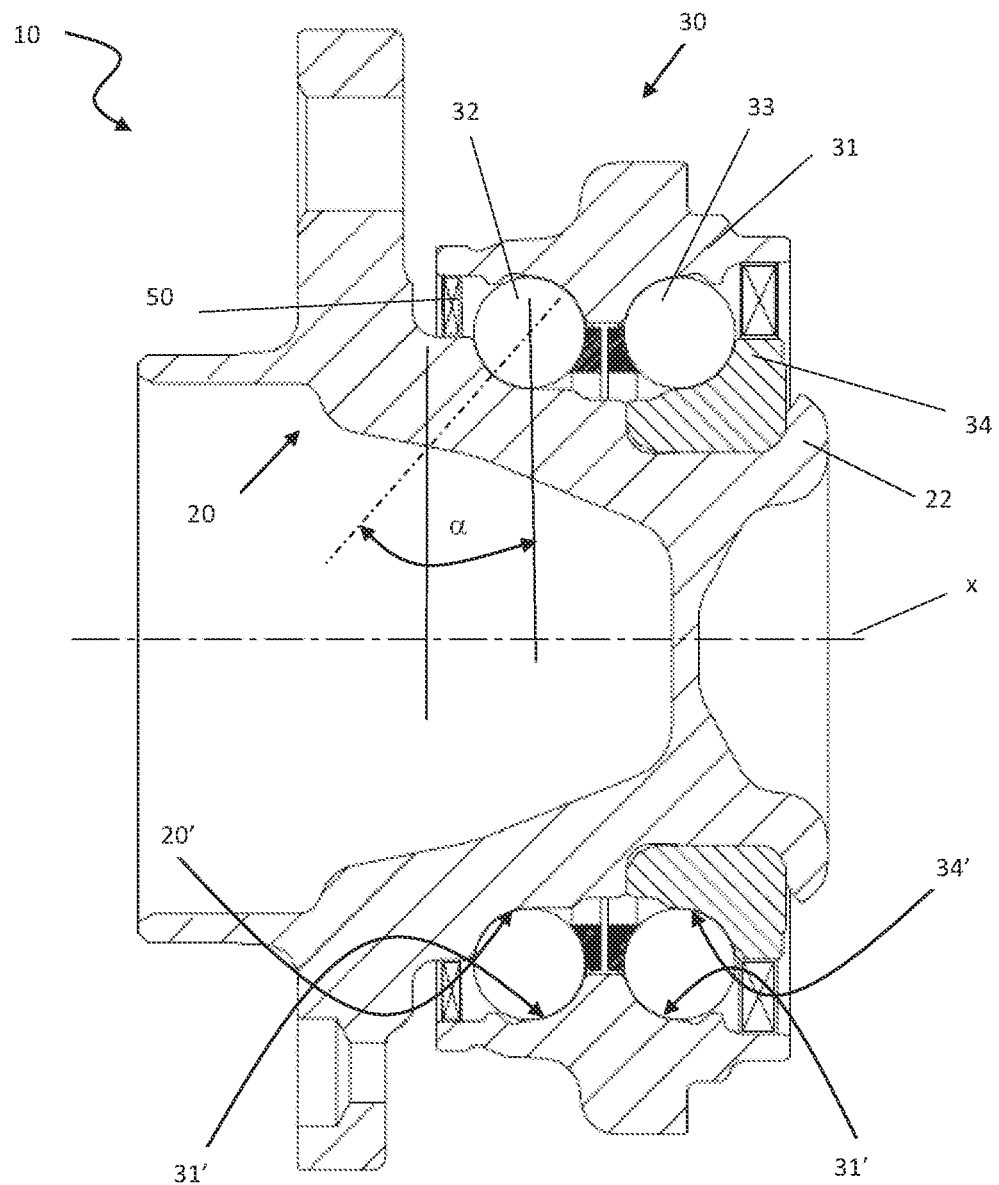
FIG. 1 is a cross section of a wheel hub assembly fitted with a bearing unit according to one aspect of the embodiments of the disclosure.

In part as a result of increasingly fierce global competition, the performance required of wheel hub assemblies is ever increasing, requiring special attention to be paid by manufacturers of such components. In particular, recent years have seen increased interest in reducing friction in bearing units as a way of reducing $CO_2$ emissions. From the point of view of the customer, who considers reducing friction to be key to determining the performance of wheel hub assemblies, the technical problem addressed by embodiments of the disclosure is how to reduce friction in the bearing unit, improving the lubrication conditions in the raceways without thereby penalizing any of the other, equally important requirements, such as noise level and service life of the bearing unit.

Document EP 2 711 512 B1 describes a wheel hub assembly in which the bearing raceways are provided with a plurality of internal "hollows" containing a liquid lubricant and a plurality of external hollows containing a solid lubricant. The hollows have a diameter of between 0.2 mm and 0.4 mm and a depth of approximately 5 µm.

Moreover, experimental evidence has demonstrated that a depth exceeding 2-3 µm from the surface of the raceway in a wheel hub assembly is considered to be highly prejudicial since it results in a very high level of noise.

It is therefore necessary to define the surface of the raceways, in particular the porosity thereof, with greater accuracy to overcome the aforementioned In part as a result of increasingly fierce global competition, the performance required of wheel hub assemblies is ever increasing, requiring special attention to be paid by manufacturers of such components. In particular, recent years have seen increased interest in reducing friction in bearing units as a way of reducing $CO_2$ emissions. From the point of view of the customer, who considers reducing friction to be key to determining the performance of wheel hub assemblies, the technical problem addressed by embodiments of the disclosure is how to reduce friction in the bearing unit, improving the lubrication conditions in the raceways without thereby penalizing any of the other, equally important requirements, such as noise level and service life of the bearing unit.

Document EP 2 711 512 B1 describes a wheel hub assembly in which the bearing raceways are provided with a plurality of internal "hollows" containing a liquid lubricant and a plurality of external hollows containing a solid lubricant. The hollows have a diameter of between 0.2 mm and 0.4 mm and a depth of approximately 5 µm.

Moreover, experimental evidence has demonstrated that a depth exceeding 2-3 µm from the surface of the raceway in a wheel hub assembly is considered to be highly prejudicial since it results in a very high level of noise.

It is therefore necessary to define the surface of the raceways, in particular the porosity thereof, with greater accuracy to overcome the aforementioned drawbacks.

Embodiments of this disclosure form a plurality of micropores on at least one raceway of the bearing unit in a calibrated and controlled manner using laser technology or an alternative technology producing the same technical effect. The "pitting" obtained with such pores encourages the continuous renewal of the oil film on the rolling interface between the raceway and the rolling body. The dimensions and density of the micropores can be optimized to reduce the friction coefficient and to improve tribological performance without adversely affecting the noise level of the bearing unit.

Embodiments of this disclosure form micropores on the surface of at least one raceway, which can be the raceway of the radially outer ring or one or both of the raceways of the radially inner rings of the bearing unit. The micropores thus formed act as micro-tanks having a depth in the range 0.05 µm to 1.5 µm to retain the grease and release said grease exactly where intended.

The technical effect is to create micro-tanks of lubricant without the risk of causing damage or noise on account of the extremely small size of the micropores.

Consequently, embodiments of this disclosure provide a wheel hub assembly in which at least one raceway is provided with a plurality of micropores on the corresponding surface in contact with the rolling bodies.

According to embodiments of this disclosure, a plurality of micropores are provided on at least one raceway of the bearing unit in a calibrated and controlled manner using laser technology or an alternative technology producing the same technical effect. The "pitting" obtained with such pores encourages the continuous renewal of the oil film on the rolling interface between the raceway and the rolling body. The dimensions and density of the micropores can be optimized to reduce the friction coefficient and to improve tribological performance without adversely affecting the noise level of the bearing unit.

Embodiments of this disclosure form micropores on the surface of at least one raceway, which can be the raceway of the radially outer ring or one or both of the raceways of the radially inner rings of the bearing unit. The micropores thus formed act as micro-tanks having a depth in the range 0.05 μm to 1.5 μm to retain the grease and release said grease exactly where intended.

The technical effect is to create micro-tanks of lubricant without the risk of causing damage or noise on account of the extremely small size of the micropores.

Consequently, a wheel hub assembly in which at least one raceway is provided with a plurality of micropores on the corresponding surface in contact with the rolling bodies.

Embodiments of this disclosure are described below with reference to a wheel hub assembly for motor vehicles provided with a bearing unit.

With reference to FIG. 1, a wheel hub assembly according to an embodiment of the disclosure is denoted as a whole using reference sign 10. The figure shows a detail of an example arrangement.

The wheel hub assembly 10 has a central axis of rotation X and a hub 20 that is preferably but not necessarily rotary, and a bearing unit 30 comprising:
 a radially outer ring 31 that is preferably but not necessarily stationary,
 a radially inner ring 20 defined by the hub 20,
 another rotary radially inner ring 34 that is mounted on and rigidly connected to the hub 20, and
 two rings of rolling bodies 32, 33 (in this example: balls) interposed between the radially outer ring 31 and the radially inner rings 20 and 34.

Throughout the present description and the claims, terms and expressions indicating position and orientation, such as "radial" and "axial", should be understood with reference to the central axis of rotation X of the bearing unit 30. On the other hand, expressions such as "axially external" and "axially internal" refer to the assembled condition of the wheel hub assembly, and in this case preferably refer to a wheel side and to a side opposite the wheel side respectively.

The radially outer ring 31 is provided with two respective radially external raceways 31', and the radially inner rings 20, 34 are provided with respective radially internal raceways 20', 34' to enable rolling of the axially external ring of rolling bodies 32 interposed between the radially outer ring 31 and the hub 20, and the axially internal ring of rolling bodies 33 between the radially outer ring 31 and the radially inner ring 34. To simplify the graphical representation, reference signs 32, 33 are used to denote both individual balls and rings of balls. Again for the sake of simplicity, the term "ball" shall be used by way of example in the present description and in the attached drawing instead of the more generic term "rolling body", and the same reference signs shall be used.

The axially internal end of the hub 20 defines a rolled edge 22 that is designed to axially preload the inner ring 34.

The wheel hub assembly 10 can also be provided with sealing means 50 to seal the bearing unit from the external environment.

Figure 2:
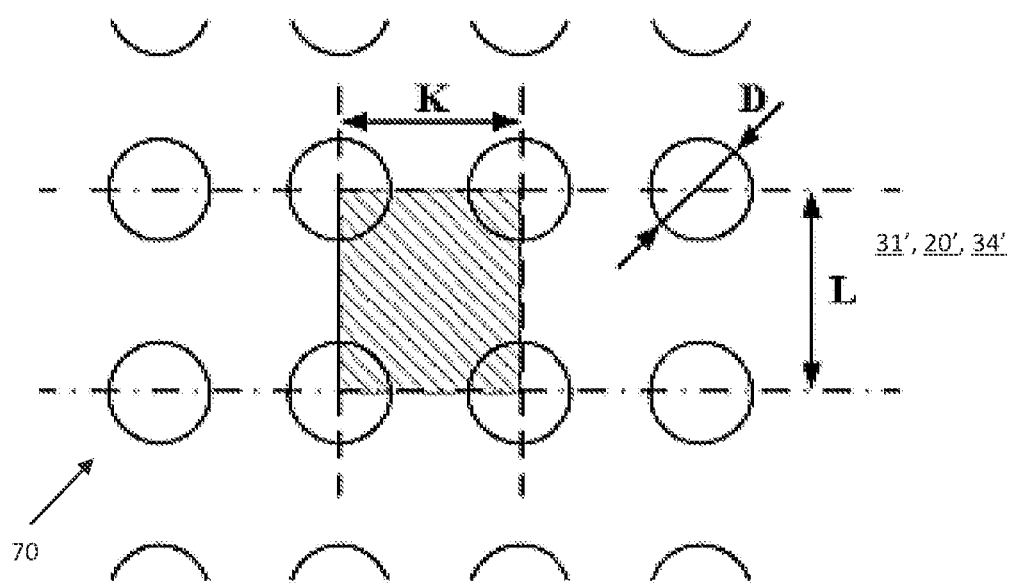
FIG. 2 is a magnified schematic detail view of the wheel hub assembly in FIG. 1 showing a plurality of micropores formed in a raceway of the bearing unit, the characteristic dimension thereof and the distribution density thereof.

With reference to FIG. 2, which is a schematic magnified detail view of the wheel hub assembly in FIG. 1 showing a plurality of micropores formed on any one of the raceways 31', 20', 34' of the bearing unit, the characteristic dimension thereof and the distribution density thereof, the inventive concept involves forming a plurality of very small micropores 70 having a depth in the order of magnitude of 1.5 μm. The plurality of micropores 70 can be reproduced on the corresponding surfaces of the raceways 31', 20', 34' in contact with the rolling bodies 32, 33 using laser technologies (for example the technologies used to mark the components) in order to create the desired shape and distribution. The shape, specific dimensions and distribution of the micropores can be customized to take account of the optimum tribological conditions of the bearing unit and the lubricating grease. The micropores act as micro-tanks having a depth H (FIG. 3) in the range 0.05-1.5 μm that hold the grease and release same exactly where intended.

The technical result is to reduce losses caused by friction in the bearing unit without causing any adverse effect in terms of damage or noise levels on account of the extremely small size of the micropores: as specified above, a surface imperfection having a depth exceeding 2-3 μm is considered to be a defect in a wheel hub assembly as it results in a noise level that is unacceptable to the end client. Furthermore, the presence of micropores provides a further advantage, specifically reducing the vibrations as a result of the improved damping value related to the contact between smooth surfaces. Finally, the data provided in the technical literature demonstrate a reduction in the amplitude of the vibrations in the presence of such a grease-lubricated surface compared to corresponding cases with oil lubrication. Consequently, grease is much more efficient than lubricating oil in reducing noise, if used in combination with raceways provided with micropores in accordance with embodiments of this disclosure.

In combination with the effects related to the dimensions of the micropores and the distribution density thereof, and as a function of different flow rate and load conditions, the reference grease should have a high capacity for friction and wear reduction and should be widely used in industrial applications.

Indeed, grease is a high-viscosity lubricant suitable for lubricating surfaces subjected to high pressures. Having regard to the relationship between the grease and the micropores, the dimensions (width and depth) of the micropores should be such as to enable the base oil of the grease to enter the micropores. The types of grease suited to use in wheel hub assemblies should be a mixture comprising:
 thickener (for example a lithium- or urea-based soap) that acts as carrier for the base oil and any additives required to use at high pressures,
 base oil having the specific function of lubricating the contact areas. In particular, the viscosity range of the base oil should be between 70 and 150 $mm^2/s$ at 40° C.

The grease must have a degree of consistency that prevents the thickener from entering and obstructing the micropores, thereby preventing the base oil from working and reducing the effectiveness of the system with potential adverse effects on the friction in the bearing. The degree of consistency should be equal to or greater than 2.

A non-limiting example is high-quality lithium-based multi-purpose grease. This grease for example has the following properties: NLGI grade: 2, thickener type: lithium, drop point: >180° C., viscosity of base oil: >100 mm²/s at 40° C.

The reduced friction is primarily attributable to the formation of a film of grease lubricant that is stable and comprises the oil film, transfer film and deposited film. The effect of the hydrodynamic pressure of the superficial micropores increases the coupling gap and reduces the probability of contact between the rough areas of the contact surfaces (raceways/rolling bodies). In the case of mixed and hydrodynamic lubricating conditions, the micropores act as micro-hydrodynamic bearings that increase the hydrodynamic pressure as a result of the asymmetrical distribution of the pressure, which results in greater hydrodynamic lift or a greater thickness of the film. Consequently, the number of rough areas in contact is reduced, and the friction and wear are also reduced. In boundary and dry-contact lubricating conditions, these micropores act as micro-tanks of lubricant to continuously retain and supply lubricant, or as micro-containers to capture wear waste and contaminant particles in order to reduce the superficial ridging caused thereby.

Advantageously and with a view to optimizing the friction-reduction/no-noise trade-off, the diameter D of the micropores (or the equivalent diameter if the micropores are not circular in shape) should fall within the range 1 μm to 5 μm.

Preferably, the depth/diameter ratio (H/D) must fall within the range 0.1-0.4 in order to minimize the friction coefficient.

The distribution density of the micropores is also important in the aforementioned trade-off. For example, the micropores on the surface of the raceways can be arranged uniformly according to a rectangular matrix with a density Td calculated using the following formula:

$$Td=(\pi D^2)/(4 \times K \times L) \times 100$$

where:

D: micropore diameter

K, L: distance in two orthogonal directions between the centres of consecutive micropores.

In general, a density of micropores of between 10% and 20% combined with the ranges of dimensions of the micropores themselves (equivalent diameter D and depth H) ensure that the micropores provide the raceway with good friction properties under all load and speed operating conditions of the bearing unit.

For density values less than 10%, the small number of micropores could result in a lack of lubricating grease on the contact surface sufficient to cause hydrostatic lift. Where micropore density values exceed 20%, despite the greater presence of lubricating grease held on the contact surface, the space between each micropore is reduced and acts as a rough area, affecting the distribution of the lubricant film and facilitating detachment thereof from the contact surface, with the resulting increase in friction resistance. Secondly, the grease could be less effective since the grease is not fully absorbed into the contact surface to form the support film, since the grease is primarily inside the micropores.

The ranges described above relating to the dimensions and distribution density of the micropores have also been determined in consideration of different potential circumstances relating to the wheel hub assembly In the case of the wheel hub assembly in FIG. 1 for example, the rolling process that axially pre-loads the radially inner ring 34 modifies the load on the raceways similarly to the forced coupling of the hub 20 to a constant velocity joint, where present.

Preferably, the burrs formed about the edges of the micropores during the laser process are removed using a delicate polishing process to achieve a roughness of less than 0.1 μm.

The flow direction should be substantially perpendicular to the axis of the micropores. In fact, it is acceptable for the axis of the micropores to be inclined by up to 15° from the direction orthogonal to the surface of the raceway This inclination can be useful to the hydrodynamic effect under mixed lubricating conditions.

As specified, embodiments of the disclosure are advantageous under all operating conditions of the bearing unit. Having regard to the range of loads and speeds for which the presence of micropores with the dimensions and distribution described above is advantageous, it should be noted that, in typical wheel hub assembly applications, the loads come from contact pressure of between 0.5 and 4 GPa and the speed range is between 100 and 1000 rpm. Naturally, the density of the micropores can be changed as a function of the operating conditions. Indeed, in the presence of low contact pressures, the surface roughness has a certain influence on overall friction behaviour, since a greater density of micropores results in a higher surface roughness, making it easier to obtain a higher friction coefficient. As load increases, on the other hand, the friction coefficient drops on account of the large quantity of oil that is constantly released by the grease and the micropores along the contact surface. Greater loads and speeds increase the shearing stress of the grease, the apparent viscosity and the thickener concentration, which facilitates the formation of a protective film and a surface smoothing phenomenon, both of which help to reduce friction.

Another important parameter in the dimensioning of this solution is the location of the micropores. Ideally, the micropores should be located on the ideal contact surface between the raceways and the rolling bodies, corresponding to the contact angle α (as shown in FIG. 1). Naturally, the actual contact surface is changed by the differing load conditions, and as such the micropores cannot be located only on the theoretical contact area. Advantageously according to the invention, the micropores have to be located along the contact surface corresponding to a substantially zero lateral acceleration. The contact surface corresponding to zero lateral acceleration is the contact surface corresponding to the nominal contact angle α with a margin of ±10°, depending on the type of tire used.

The micropores can be formed using high-power laser pulses to ablate the material by means of rapid fusion and vaporization. The laser technology used must be able to provide a low thermal effect on the surface of the metal material, thereby avoiding the generation of re-melt layers where possible. This aspect is very important for wheel hub assemblies, since the bearing units have a thermally treated area corresponding to the raceway to improve the fatigue resistance related to the rolling.

Furthermore, having regard to the technology used to form the micropores along a flat surface, it should be noted that the surface of the raceways is not flat but substantially toroidal. Consequently, since the distance between the laser pointer and the surface is variable, at least the power and orientation of the laser must be adjustable.

To obtain such features, an example application is a laser with an output wavelength<600 nm, a pulse width≤85 nm and a power of approximately 25 W.

Figure 3:
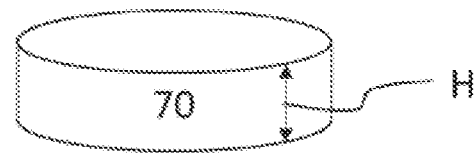
FIG. 3 is a magnified schematic detail view of a micropore formed in a raceway of a bearing unit having the characteristic depth dimension thereof, wherein a micropore is elliptically-shaped, for example.

The shape of the micropores need not necessarily be circular. For example, the shape of the micropores can be elliptical (FIG. 3). In particular, the elliptical shape could have an eccentricity in the range 1 to 5 with the major axis arranged in the rolling direction of the rolling bodies 32, 33 in relation to the raceways (31', 20', 34').

In conclusion, embodiments of this disclosure provide numerous advantages related to:
- improved lubrication conditions with resulting improvement in the service life of the bearing unit and performance in terms of friction resistance,
- improved reliability of the rotary contact elements as a result of improved lubrication,
- potential reduction in the grease filling level, again as a result of better lubrication conditions,
- no adverse effects in terms of noise level.

There are numerous other variants in addition to the embodiments described above. Furthermore, said embodiments are merely examples that limit neither the scope nor the application nor the possible arrangements of the invention. Indeed, although the above description enables the person skilled in the art to carry out the present invention according to at least one example embodiment thereof, many variants of the described components can also be used without thereby moving outside the scope of the invention as defined in the attached claims, which should be understood literally and/or according to the legal equivalents thereof.

What is claimed is:

1. A wheel bearing assembly for motor vehicles, comprising a hub and a bearing unit, the bearing unit comprising:
   a radially outer ring, comprising a raceway;
   at least one radially inner ring comprising at least one raceway;
   at least one row of rolling bodies interposed between the radially outer ring and the at least one radially inner ring configured for sliding inside the raceways,
   wherein at least one raceway of said radially outer ring and said at least one radially inner ring is provided with a plurality of superficial micropores having a depth (H) between 0.05 μm and 1.5 μm and defining respective micro-tanks for containing a lubricating grease.

2. The wheel bearing assembly according to claim 1, wherein an equivalent diameter (D) of the micropores ranges between 1 μm and 5 μm.

3. The wheel bearing assembly according to claim 1, wherein the micropores have a ratio between depth (H) and equivalent diameter (D) ranging between 0.1 and 0.4.

4. The wheel bearing assembly according to claim 1, wherein a density (Td) of the micropores comprises between 10% and 20% and is calculated according to the following formula:

$$Td=(\pi D^2)/(4 \times K \times L) \times 100$$

where:
D: equivalent diameter of the micropores; and
K, L: distance in two orthogonal directions of the centers of two consecutive micropores.

5. The wheel bearing assembly according to claim 1, wherein the lubricating grease is a mixture comprising a base oil with a viscosity range between 70 and 150 mm²/s at 40° C. and a thickener that acts as a carrier for the base oil.

6. The wheel bearing assembly according to claim 5, wherein the lubricating grease has a degree of consistency greater than or equal to 2.

7. The wheel bearing assembly according to claim 1, wherein the surface roughness around the edges of the micropores is less than 0.1 μm.

8. The wheel bearing assembly according to claim 1, wherein the axis of the micropores has an inclination with respect to the orthogonal direction of the raceway between 0° and 15°.

9. The wheel bearing assembly according to claim 1, wherein the micropores are located along a contact surface between the raceway and the rolling bodies, said surface being angularly included in a range between −10° and +10° with respect to a nominal contact angle (a) between the raceway and rolling bodies, said nominal contact angle (a) being defined with respect to a radial plane of the bearing unit.

10. The wheel bearing assembly according to claim 1, wherein the shape of the micropores is elliptical with eccentricity between 1 and 5 and with the major axis arranged along the rolling direction of the rolling bodies with respect to the raceway.

11. A bearing unit comprising:
    a radially outer ring, comprising a raceway;
    at least one radially inner ring comprising at least one raceway;
    at least one row of rolling bodies interposed between the radially outer ring and the at least one radially inner ring configured for sliding inside the raceways,
    wherein at least one raceway of said radially outer ring and said at least one radially inner ring is provided with a plurality of superficial micropores having a depth (H) between 0.05 μm and 1.5 μm and defining respective micro-tanks for containing a lubricating grease.

12. The bearing unit according to claim 11, wherein an equivalent diameter (D) of the micropores ranges between 1 μm and 5 μm.

13. The bearing unit according to claim 11, wherein the micropores have a ratio between depth (H) and equivalent diameter (D) ranging between 0.1 and 0.4.

14. The bearing unit according to claim 11, wherein a density (Td) of the micropores comprises between 10% and 20% and is calculated according to the following formula:

$$Td=(\pi D^2)/(4 \times K \times L) \times 100$$

where:
D: equivalent diameter of the micropores; and
K, L: distance in two orthogonal directions of the centers of two consecutive micropores.

15. The bearing unit according to claim 11, wherein the lubricating grease is a mixture comprising a base oil with a viscosity range between 70 and 150 mm²/s at 40° C. and a thickener that acts as a carrier for the base oil.

16. The bearing unit according to claim 15, wherein the lubricating grease has a degree of consistency greater than or equal to 2.

17. The bearing unit according to claim 11, wherein the surface roughness around the edges of the micropores is less than 0.1 μm.

18. The bearing unit according to claim 11, wherein the axis of the micropores has an inclination with respect to the orthogonal direction of the raceway between 0° and 15°.

19. The bearing unit according to claim 11, wherein the micropores are located along a contact surface between the raceway and the rolling bodies, said surface being angularly included in a range between −10° and +10° with respect to a nominal contact angle (a) between the raceway and rolling bodies, said nominal contact angle (a) being defined with respect to a radial plane of the bearing unit.

20. The bearing unit according to claim 11, wherein the shape of the micropores is elliptical with eccentricity between 1 and 5 and with the major axis arranged along the rolling direction of the rolling bodies with respect to the raceway.

\* \* \* \* \*